United States Patent
Kim et al.

(10) Patent No.: US 8,582,007 B2
(45) Date of Patent: Nov. 12, 2013

(54) IMAGE SENSOR FOR OUTPUTTING RGB BAYER SIGNAL THROUGH INTERNAL CONVERSION AND IMAGE PROCESSING APPARATUS INCLUDING THE SAME

(75) Inventors: Bum Suk Kim, Hwaseong-si (KR); Jung Chak Ahn, Yongin-si (KR); Tae Sub Jung, Anyang-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 323 days.

(21) Appl. No.: 12/878,440

(22) Filed: Sep. 9, 2010

(65) Prior Publication Data

US 2011/0063482 A1  Mar. 17, 2011

(30) Foreign Application Priority Data

Sep. 15, 2009 (KR) .......................... 10-2009-086789

(51) Int. Cl.
*H04N 5/335* (2011.01)
(52) U.S. Cl.
USPC .......................................... 348/275; 348/279
(58) Field of Classification Search
USPC .................. 348/222.1, 272–280, 239, 308
See application file for complete search history.

(56) References Cited

U.S. PATENT DOCUMENTS

2009/0040353 A1* 2/2009 Yamamoto ..................... 348/308
2012/0019710 A1* 1/2012 Oi ................................. 348/349

FOREIGN PATENT DOCUMENTS

| JP | 10-066094 A | 3/1998 |
| JP | 2005-295381 A | 10/2005 |
| JP | 2007-184904 A | 7/2007 |

OTHER PUBLICATIONS

Kodak High Sensitivity Image Sensor Tech- New KODAK Image Sensor Technology Redefines Digital Image Capture, Jun. 14, 2007, http://www.dpreview.com/news/0706/07061401kodakhighsens.asp.

* cited by examiner

*Primary Examiner* — Tuan Ho
(74) *Attorney, Agent, or Firm* — Harness, Dickey & Pierce, P.L.C.

(57) ABSTRACT

The image sensor includes a pixel array including a plurality of pixels arranged in a non-red-green-blue (RGB) Bayer pattern, an analog-to-digital converter configured to convert an analog pixel signal output from each of the pixels into a digital pixel signal, and an RGB converter configured to convert the digital pixel signal into an RGB Bayer signal. Accordingly, the image sensor is compatible with a universal image signal processor (ISP), which receives and processes RGB Bayer signals, without an additional compatible device or module.

10 Claims, 20 Drawing Sheets

FIG. 1 (CONVENTIONAL ART)

| R | G | R | G | R |
|---|---|---|---|---|
| G | B | G | B | G |
| R | G | R | G | R |
| G | B | G | B | G |
| R | G | R | G | R |

FIG. 3

|     | C1  | C2  | C3  | C4  | ··· | Cm  |
|-----|-----|-----|-----|-----|-----|-----|
| R1  | P11 | P12 | P13 | P14 | ··· | P1m |
| R2  | P21 | P22 | P23 | P24 | ··· | P2m |
| R3  | P31 | P32 | P33 | P34 | ··· | P3m |
| R4  | P41 | P42 | P43 | P44 | ··· | P4m |
| ⋮   | ⋮   | ⋮   | ⋮   | ⋮   | ⋮   | ⋮   |
| Rn  | Pn1 | Pn2 | Pn3 | Pn4 | ··· | Pnm |

FIG. 4A

| W | B | W | R |
|---|---|---|---|
| B | G | R | G |
| W | R | W | B |
| R | G | B | G |

FIG. 4B

| W | R | W | G |
|---|---|---|---|
| B | W | G | W |
| W | G | W | B |
| G | W | R | W |

FIG. 4C

| W | R | W | G |
|---|---|---|---|
| B | W | G | W |
| W | G | W | R |
| G | W | B | W |

FIG. 4D

| G | W | R | W |
|---|---|---|---|
| W | G | W | R |
| B | W | G | W |
| W | B | W | G |

FIG. 4E

| W | G |
|---|---|
| R | B |
| G | W |
| B | R |

FIG. 8

|    | C1  | C2  | C3  | C4  | C5  |
|----|-----|-----|-----|-----|-----|
| R1 | A11 | A12 | A13 | A14 | A15 |
| R2 | A21 | A22 | A23 | A24 | A25 |
| R3 | A31 | A32 | A33 | A34 | A35 |
| R4 | A41 | A42 | A43 | A44 | A45 |
| R5 | A51 | A52 | A53 | A54 | A55 |

LB

⇩

|    | C1 | C2 | C3 | C4 | C5 |
|----|----|----|----|----|----|
| R1 | R  | G  | R  | G  | R  |
| R2 | G  | B  | G  | B  | G  |
| R3 | R  | G  | R  | G  | R  |
| R4 | G  | B  | G  | B  | G  |
| R5 | R  | G  | R  | G  | R  |

IMAGE SENSOR FOR OUTPUTTING RGB BAYER SIGNAL THROUGH INTERNAL CONVERSION AND IMAGE PROCESSING APPARATUS INCLUDING THE SAME

CROSS-REFERENCE TO RELATED APPLICATION(S)

This application claims the benefit of Korean Patent Application No. 10-2009-0086789, filed on Sep. 15, 2009, in the Korean Intellectual Property Office, the disclosure of which is incorporated by reference herein in its entirety.

BACKGROUND

1. Field

The present invention relates to an image sensor and an image processing apparatus including the same, for example, to an image sensor for converting a signal output from a filter array having a different structure than a red-green-blue (RGB) Bayer and outputting an RGB Bayer signal and an image processing apparatus including the same.

2. Description of Related Art

With the high integration of charge-coupled devices (CCDs) and complementary metal-oxide semiconductor (CMOS) devices and the rapid development of image processing technology, the digital camera market has rapidly expanded and it has become usual that mobile devices such as mobile phones and personal digital assistants (PDAs) are provided with a digital camera function.

An image processing apparatus captures an image of an object using an image sensor such as a CCD or a CMOS device. Image sensors usually use a pixel array in an RGB Bayer pattern as illustrated in FIG. 1. Image sensors include a plurality of unit pixels converting a light signal corresponding to an object into an electrical signal. Each of the unit pixels included in a typical image sensor using the pixel array illustrated in FIG. 1 detects one value among a red (R) value, a green (G) value, and a blue (B) value. The R, G, or B value detected by each unit pixel is converted into a digital signal by an analog-to-digital converter (ADC) included in the image sensor and the digital signal is input to an image signal processor (ISP).

The real color of an object can be represented by combining R, G, and B. Data detected by each unit pixel of the image sensor, however, contains information about only one of R, G, and B (such digital data is referred to as RGB Bayer data). Accordingly, the ISP performs color interpolation using R, G, and B data detected by the unit pixels so that a single unit pixel contains all R, G, and B information. Consequently, the ISP processes RGB Bayer data output from the image sensor to provide a signal based on which a display device, e.g., a liquid crystal display (LCD), can display an image.

Recently, there have been introduced pixel arrays having different patterns from the RGB Bayer pattern illustrated in FIG. 1. When an image sensor uses a pixel array having a pattern different from the RGB Bayer pattern, there occurs a problem in that the image sensor is not compatible with a universal ISP which receives and processes RGB Bayer data.

SUMMARY

An embodiment of the present invention provide an image sensor for converting an electrical signal output from a pixel array having a different pattern from a red-green-blue (RGB) Bayer pattern into an RGB Bayer signal and an image processing apparatus including the same.

According to an embodiment of the present invention an image sensor includes a pixel array including a plurality of pixels arranged in a non-red-green-blue (RGB) Bayer pattern, an analog-to-digital converter configured to convert an analog pixel signal output from each of the pixels into a digital pixel signal, and an RGB converter configured to convert the digital pixel signal into an RGB Bayer signal.

In an embodiment, RGB Bayer signals respectively corresponding to the plurality of pixels include a first row of signals having R pixel signals alternate with G pixel signals, and a second row of signals in which G pixel signals alternate with B pixel signals.

In an embodiment, the RGB converter uses a digital pixel signal as the RGB Bayer signal when the digital pixel signal corresponding to a target pixel represents a same type or color as the RGB Bayer signal corresponding to the target pixel, and the RGB converter performs an operation on at least two digital pixel signals to output the RGB Bayer signal when the digital pixel signal corresponding to the target pixel is not the same type or color as the RGB Bayer signal corresponding to the target pixel.

In an embodiment, the operation performed by the RGB converter is at least one of interpolation, weighted averaging, averaging, and summing.

In an embodiment, the RGB converter selects at least two digital pixel signals corresponding to pixels in an operation block including a target pixel, and the RGB converter performs an operation on the selected digital pixel signals to output an RGB Bayer signal corresponding to the target pixel.

In an embodiment, the RGB converter selects the at least two digital pixel signals from among digital pixel signals in the operation block having a same type or color as an RGB Bayer signal of the target pixel.

In an embodiment, the operation block is a group of pixels including the target pixel and pixels neighboring the target pixel.

According to an embodiment of the present invention, an image sensor includes a pixel array including a plurality of pixels arranged in a non-RGB Bayer pattern, an RGB converter configured to convert an analog pixel signal output from each of the pixels into an RGB Bayer signal, and an analog-to-digital converter configured to convert the RGB Bayer signal into a digital RGB Bayer signal.

In an embodiment, the RGB converter uses an analog pixel signal as the RGB Bayer signal when the analog pixel signal corresponding to a target pixel represents a same type or color as the RGB Bayer signal corresponding to the target pixel, and the RGB converter performs an operation on at least two analog pixel signals to output the RGB Bayer signal when the analog pixel signal corresponding to the target pixel is not the same type or color as the RGB Bayer signal corresponding to the target pixel.

In an embodiment, the at least two analog pixel signals are selected from an operation block including the target pixel and pixels neighboring the target pixel.

In an embodiment, the RGB converter selects at least two analog pixel signals from among pixels in an operation block including a target pixel and performs an operation on the selected analog pixel signals to output an RGB Bayer signal of the target pixel.

In an embodiment, the RGB converter selects the at least two analog pixel signals from among analog pixel signals in the operation block having the same type or color as an RGB Bayer signal of the target pixel.

In an embodiment, the image sensor further includes an output buffer configured to buffer and output the RGB Bayer signal to an external image signal processor.

In an embodiment, the external image signal processor is configured to directly receive and process only RGB Bayer data.

According to an embodiment of the present invention, an image sensor includes a pixel array including a plurality of pixels arranged in a non-red-green-blue (RGB) Bayer pattern, each of the plurality of pixels configured to output a data signal in response to a light source, and an RGB converter configured to convert the plurality of data signals into RGB Bayer signals such that the RGB Bayer signals are arranged in a RGB Bayer pattern.

In an embodiment, the image sensor includes an output buffer configured to buffer and output the RGB Bayer signals to an external image signal processor configured to receive and process only RGB Bayer data, where the external image signal processor does not include any intervening compatible device or module for converting non-RGB Bayer data to RGB Bayer data.

In an embodiment, the RGB converter is configured to convert the plurality of data signals at least one of before and after the plurality of data signals are converted from analog to digital signals by an analog-to-digital converter.

BRIEF DESCRIPTION OF THE DRAWINGS

The above and other features and advantages of the present invention will become more apparent by describing in detail example embodiments thereof with reference to the attached drawings in which:

FIG. 1 is a diagram of a conventional red-green-blue (RGB) Bayer pattern;

FIG. 3 is a conceptual diagram of a pixel array illustrated in FIG. 2;

FIGS. 4A through 4G are diagrams of examples of patterns of the pixel array illustrated in FIG. 3;

FIG. 8 is a diagram showing the operation of an RGB converter illustrated in FIG. 7;

DETAILED DESCRIPTION

Figure 2:
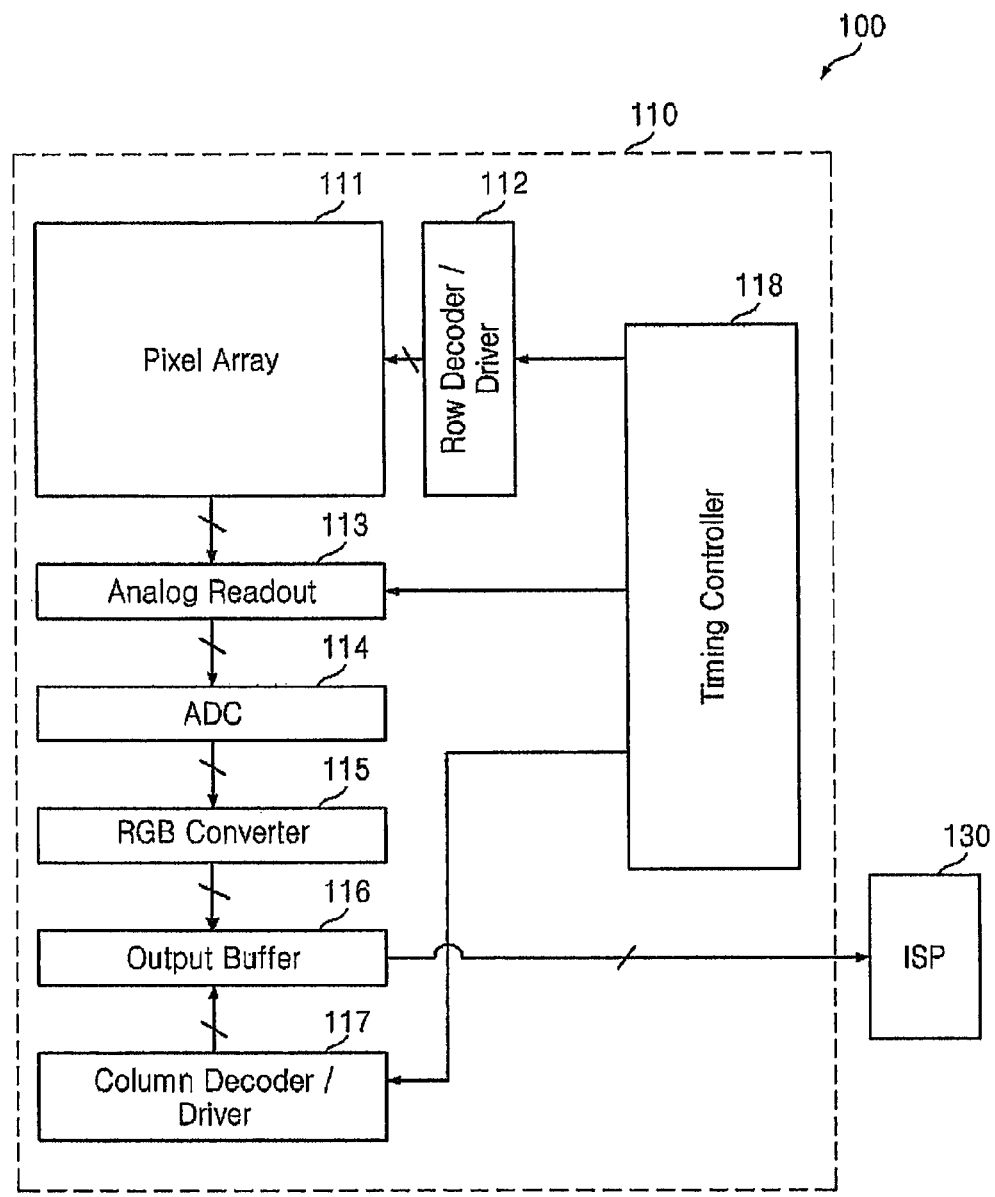
FIG. 2 is a schematic block diagram of an image processing apparatus according to an embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

Spatially relative terms, such as "at least one of," "below," "selected," "a part of," "remaining," "around," "over," "lower portion," and the like, may be used herein for ease of description to describe one element or feature's relationship to another element(s) or feature(s) as illustrated in the figures. The terminology used herein is for the purpose of describing example embodiments only and is not intended to be limiting of the present invention. The accompanying figures are not to be considered as drawn to scale unless explicitly noted.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 2 is a schematic block diagram of an image processing apparatus 100 according to an embodiment of the present invention. FIG. 3 is a conceptual diagram of a pixel array 111 illustrated in FIG. 2. FIGS. 4A through 4G are diagrams of examples of patterns of the pixel array 111 illustrated in FIG. 3.

Referring to FIGS. 2 through 3, the image processing apparatus 100 includes an image sensor 110 and an image signal processor (ISP) 130. The image sensor 110 and the ISP 130 may be implemented in separate chips or modules, respectively.

The image sensor 110 generates an image signal corresponding to a photographed object based on incident light. The image sensor 110 includes a pixel array (such as an active pixel array) 111, a row decoder/driver 112, an analog readout circuit 113, an analog-to-digital converter (ADC) 114, an RGB converter 115, an output buffer 116, a column decoder/driver 117 and a timing controller 118.

Referring to FIG. 3, the pixel array 111 may include a plurality of pixels P11 through Pnm connected to a plurality of row lines R1 through Rn and a plurality of column lines C1 through Cm in a two-dimensional matrix form, where "n" and "m" are natural numbers.

In addition, above the pixels P11 through Pnm included in the pixel array 111 is disposed a color filter which includes color filters each allowing for a particular color spectrum of light to pass through. The color filter may be a red color filter (R), a green color filter (G), a blue color filter (B), a white color filter (W), and a yellow color filter (Y). The color filter may further be a magenta color filter (Mg), a cyan color filter (Cy), and a black color filter (BL).

The pixel array 111 includes a color filter disposed above each of the pixels P11 through Pnm arranged in a two-dimensional matrix form and a circuit (e.g., one of circuits illustrated in FIGS. 5A through 5D) corresponding to the color filter. For clarity of description, however, a color of each color filter will be associated to the corresponding pixel.

Examples of the pattern of the pixel array 111 are illustrated in FIGS. 4A through 4G. Referring to FIGS. 4A through 4G, the pixel array 111 has a non-red-green-blue (RGB) Bayer pattern. In FIGS. 4A through 4G, first type pixels W are white pixels; second type pixels B are blue pixels; third type pixels R are red pixels; fourth type pixels G are green pixels, and fifth type pixels Y are yellow pixels.

Figure 4A:
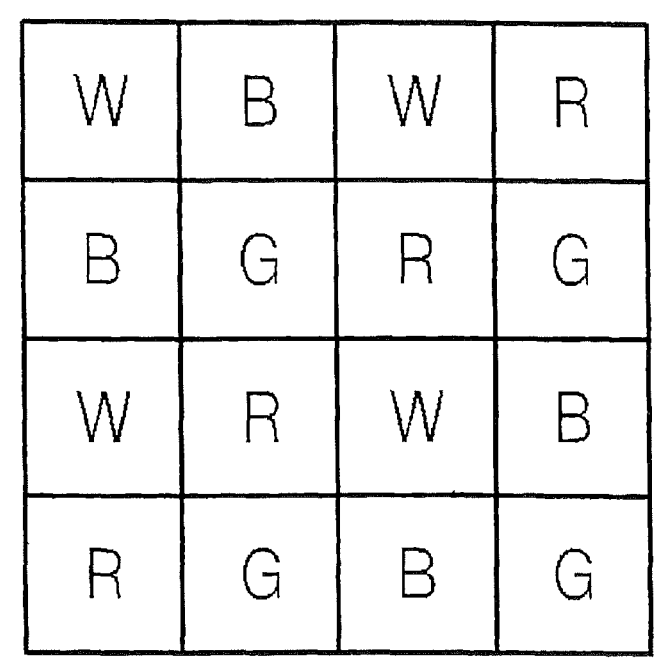

Referring to FIG. 4A, the pixel array 111 may have a plurality of 4*4 basic pixel blocks arranged in all directions. Each of the basic pixel blocks includes a first type pixel W, a second type pixel B, a first type pixel W, and a third type pixel R sequentially arranged in a first row; a second type pixel B, a fourth type pixel G, a third type pixel R, and a fourth type pixel G sequentially arranged in a second row; a first type pixel W, a third type pixel R, a first type pixel W, and a second type pixel B sequentially arranged in a third row; and a third type pixel R, a fourth type pixel G, a second type pixel B, and a fourth type pixel G sequentially arranged in a fourth row. The first type pixels W are white pixels; the second type pixels B are blue pixels; the third type pixels R are red pixels; and the fourth type pixels G are green pixels.

Figure 4B:
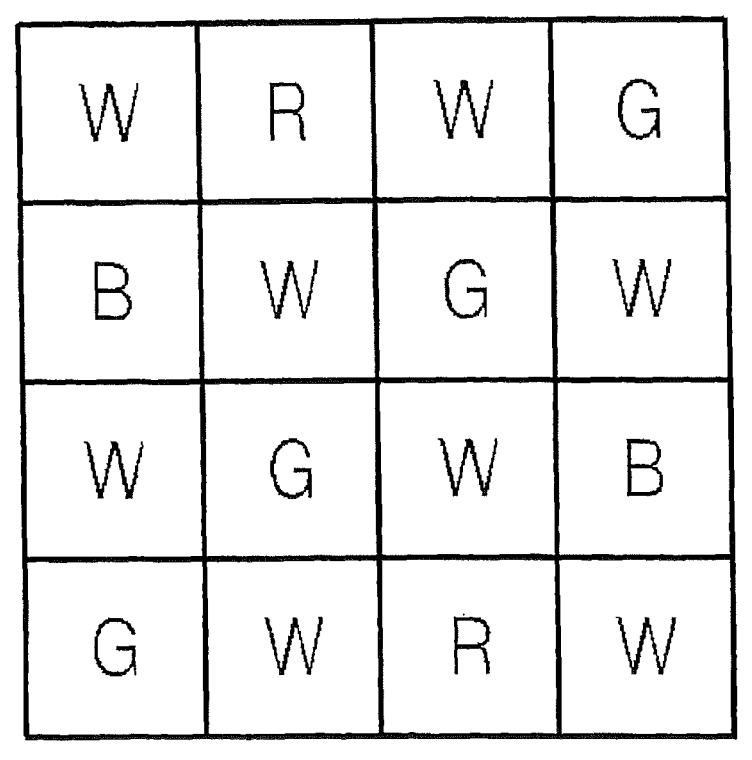

Referring to FIG. 4B, the pixel array 111 may have a plurality of 4*4 basic pixel blocks arranged in all directions. Each of the basic pixel blocks includes a first type pixel W, a third type pixel R, a first type pixel W, and a fourth type pixel G sequentially arranged in a first row; a second type pixel B, a first type pixel W, a fourth type pixel G, and a first type pixel W sequentially arranged in a second row; a first type pixel W, a fourth type pixel G, a first type pixel W, and a second type pixel B sequentially arranged in a third row; and a fourth type pixel G, a first type pixel W, a third type pixel R, and a first type pixel W sequentially arranged in a fourth row.

Figure 4C:
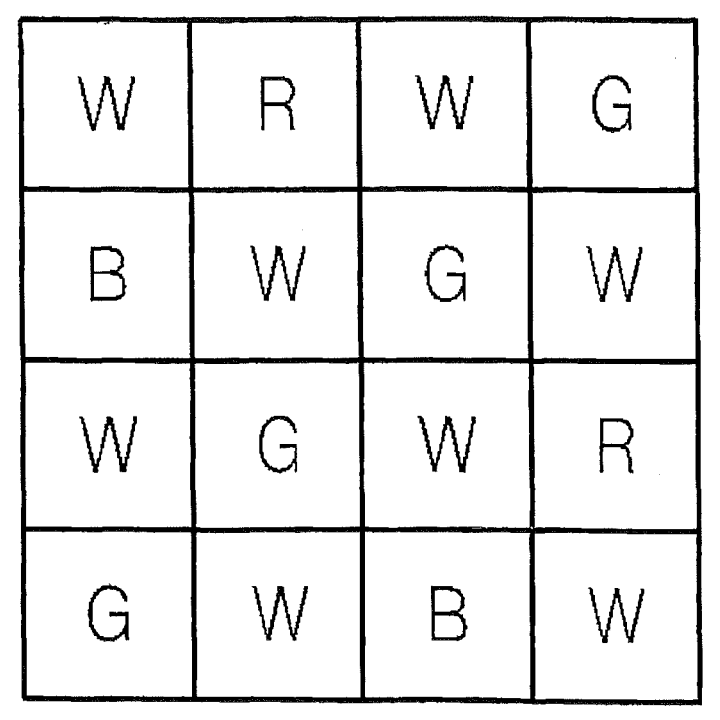

Referring to FIG. 4C, the pixel array 111 may have a plurality of 4*4 basic pixel blocks arranged in all directions. Each of the basic pixel blocks includes a first type pixel W, a third type pixel R, a first type pixel W, and a fourth type pixel G sequentially arranged in a first row; a second type pixel B, a first type pixel W, a fourth type pixel G, and a first type pixel W sequentially arranged in a second row; a first type pixel W, a fourth type pixel G, a first type pixel W, and a third type pixel R sequentially arranged in a third row; and a fourth type pixel G, a first type pixel W, a second type pixel B, and a first type pixel W sequentially arranged in a fourth row.

Figure 4D:
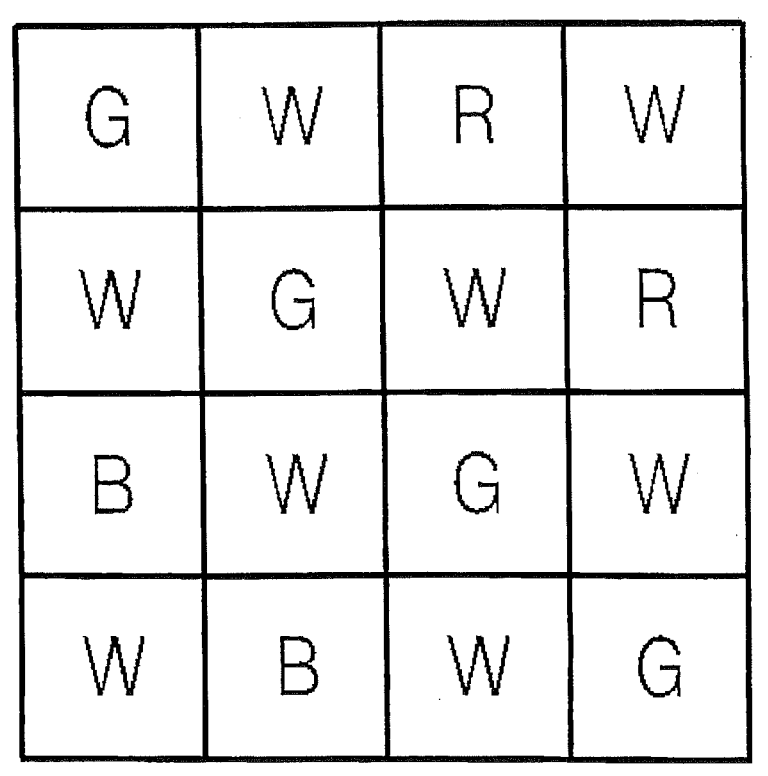

Referring to FIG. 4D, the pixel array 111 may have a plurality of 4*4 basic pixel blocks arranged in all directions. Each of the basic pixel blocks includes a fourth type pixel G, a first type pixel W, a third type pixel R, and a first type pixel W sequentially arranged in a first row; a first type pixel W, a fourth type pixel G, a first type pixel W, and a third type pixel R sequentially arranged in a second row; a second type pixel B, a first type pixel W, a fourth type pixel G, and a first type pixel W sequentially arranged in a third row; and a first type pixel W, a second type pixel B, a first type pixel W, and a fourth type pixel G sequentially arranged in a fourth row.

Figure 4E:
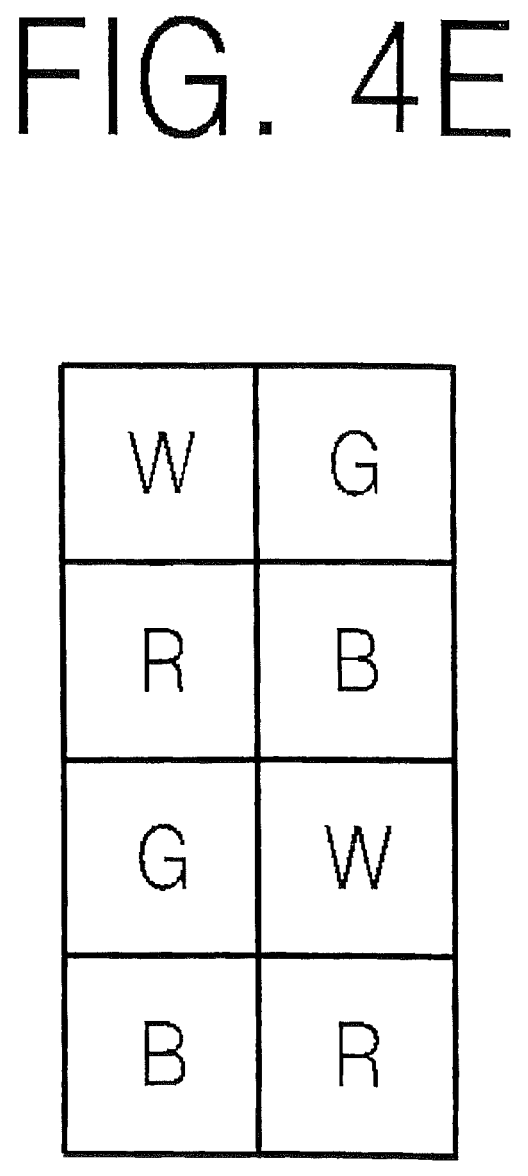

Referring to FIG. 4E, the pixel array 111 may have a plurality of 4*2 basic pixel blocks arranged in all directions. Each of the basic pixel blocks includes a first type pixel W and fourth type pixel G sequentially arranged in a first row; a third type pixel R and a second type pixel B sequentially arranged in a second row; a fourth type pixel G and a first type pixel W sequentially arranged in a third row; and a second type pixel B and a third type pixel R sequentially arranged in a fourth row.

Figure 4F:
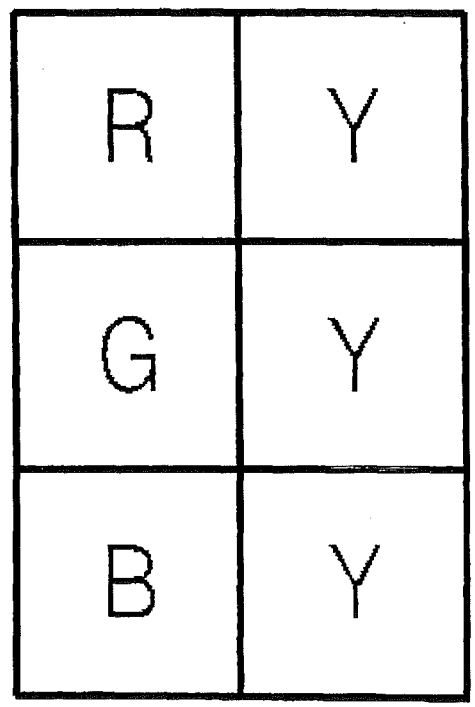

Referring to FIG. 4F, the pixel array 111 may have a plurality of 3*2 basic pixel blocks arranged in all directions. Each of the basic pixel blocks includes a third type pixel R and a fifth type pixel Y sequentially arranged in a first row; a fourth type pixel G and a fifth type pixel Y sequentially arranged in a second row; and a second type pixel B and a fifth type pixel Y sequentially arranged in a third row.

Figure 4G:
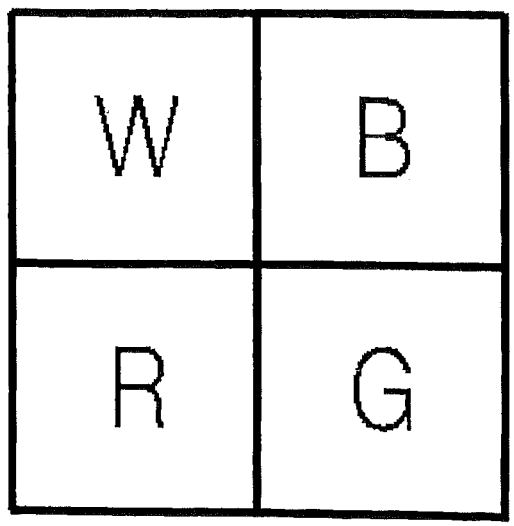

Referring to FIG. 4G, the pixel array 111 may have a plurality of 2*2 basic pixel blocks arranged in all directions. Each of the basic pixel blocks includes a first type pixel W and a second type pixel B sequentially arranged in a first row; and a third type pixel R and a fourth type pixel G sequentially arranged in a second row.

The pixel array 111 may have one of the patterns illustrated in FIGS. 4A through 4G in different embodiments of the present invention, but a non-RGB Bayer pattern pixel array according to the present invention is not restricted to the pixel arrays illustrated in FIGS. 4A through 4G. For example, the pixel array 111 may be implemented in various patterns and sizes, such as 2*2, 3*3, and 4*4 mosaic patterns and striped patterns in which R, G, B, magenta (Mg), cyan (Cy), yellow (Y), black (BL), white (W), and so on are combined.

Figure 5A:
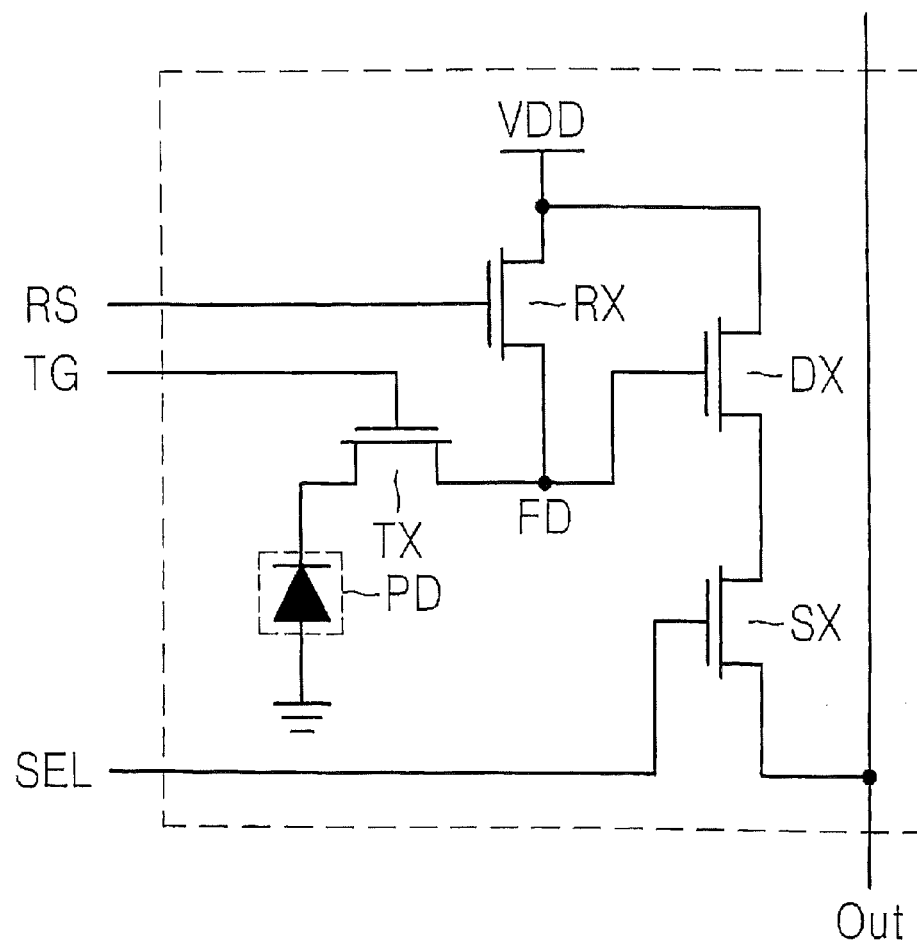
FIGS. 5A through 5D are circuit diagrams of examples of a pixel included in a pixel array according to an embodiment of the present invention.

FIGS. 5A through 5D are circuit diagrams of examples of each of the pixels P11 through Pnm included in the pixel array 111 according to an embodiment of the present invention. Referring to FIG. 5A, the pixel includes a photo sensitive device PD, a transfer transistor TX, a floating diffusion node FD, a reset transistor RX, a drive transistor (or a source follow transistor) DX, and a select transistor SX.

The photo sensitive device PD receives light from a luminous body and generates and accumulates photocharge. The transfer transistor TX transfers the photocharge (or photocurrent) accumulated by the photo sensitive device PD to the floating diffusion node FD in response to a transfer control signal TG input to a gate thereof. The floating diffusion node FD is formed of a floating diffusion region. The floating diffusion node FD receives the photocharge generated by the photo sensitive device PD via the transfer transistor TX and stores it.

The reset transistor RX is connected between a power supply voltage VDD and the floating diffusion node FD and resets the floating diffusion node FD to the power supply voltage VDD in response to a reset signal RS input to a gate thereof. The drive transistor DX is connected between the power supply voltage VDD and a first node and causes the first node to source follow the power supply voltage VDD based on the charge stored in the floating diffusion node FD. The select transistor SX is connected between the first node and an output node and forms an electrical path between the first node and the output node in response to a selection signal SEL input to a gate thereof.

A plurality of pixels may output pixel signals, e.g., a reset signal and an image signal, for each column in response to a plurality of control signals, e.g., TG, RS, and SEL in FIG. 5A, generated by the row decoder/driver 112.

FIG. 5A shows the pixel including a single photo sensitive device PD and four MOS transistors TX, RX, DX, and SX, but the present invention is not restricted to the embodiments illustrated in FIG. 5A. The present invention may be applied to any circuits that include a photo sensitive device PD and at least three transistors including the drive transistor DX and the select transistor SX.

Figure 5B:
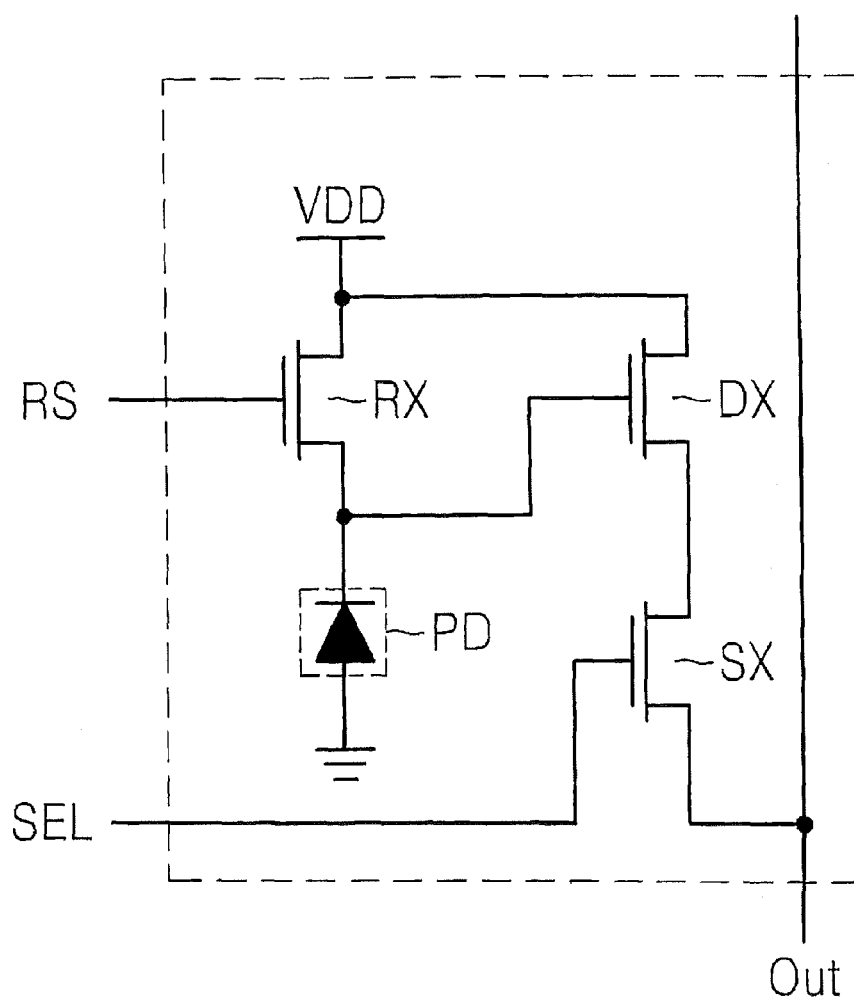
Figure 5C:
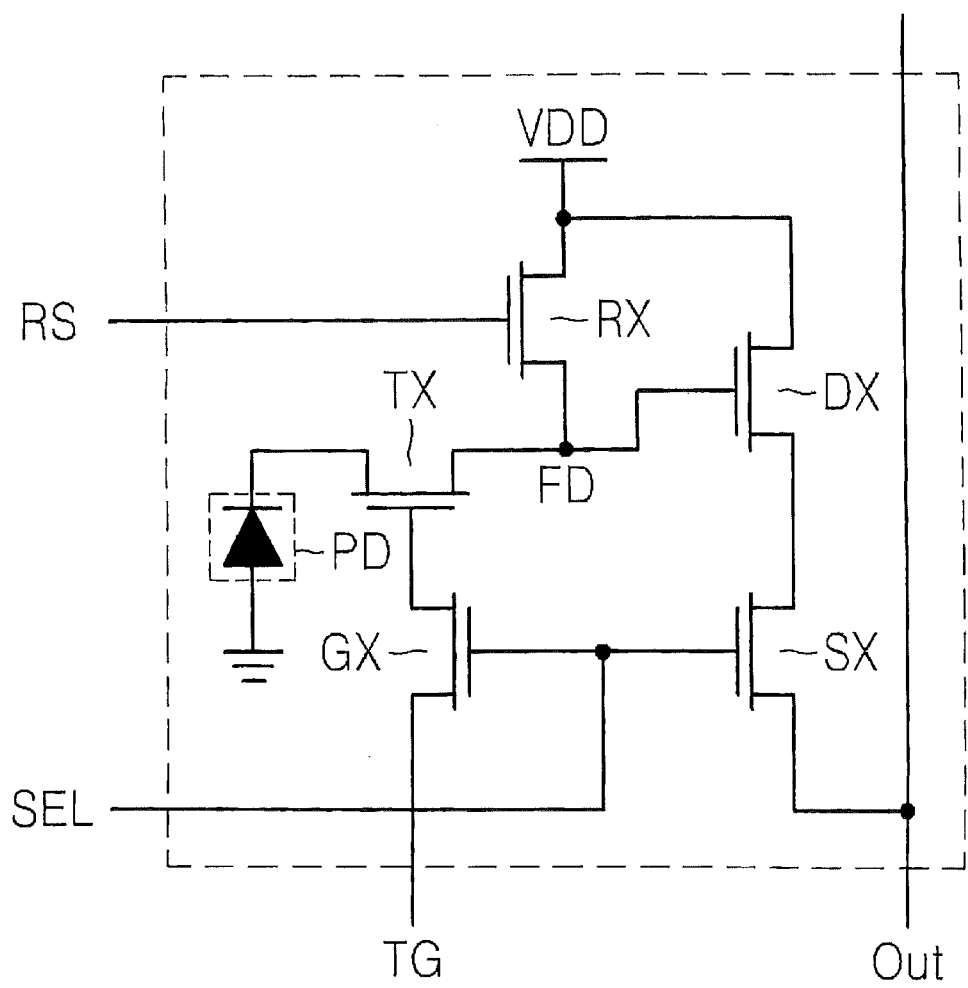
Figure 5D:
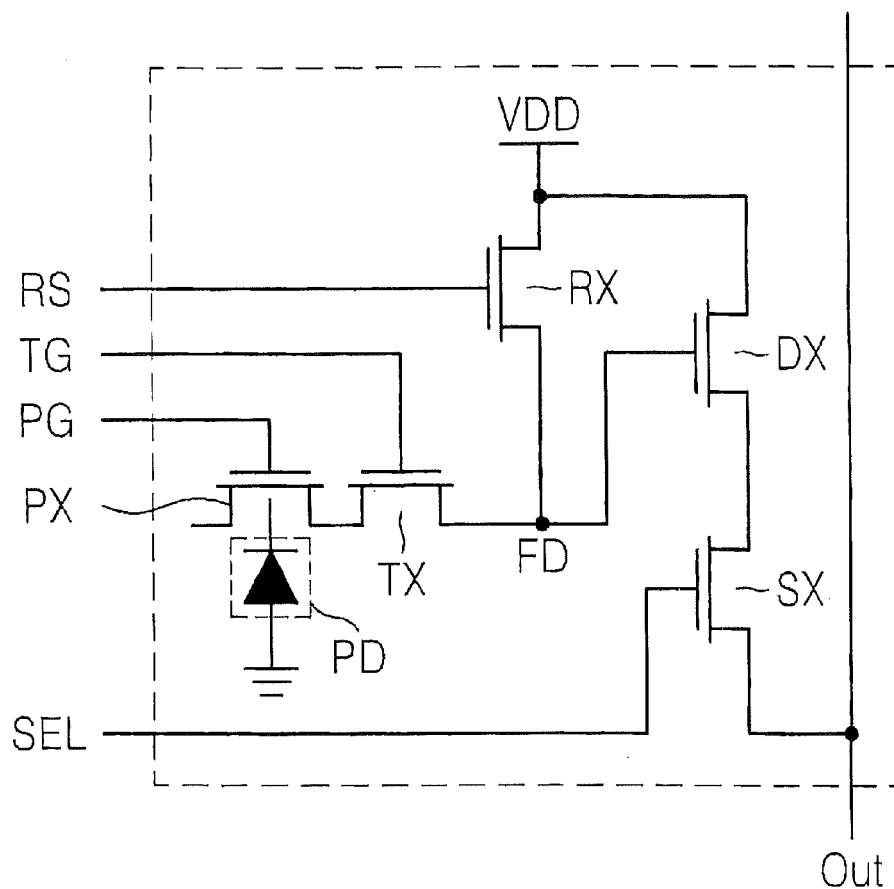

As the pixels in FIGS. 5B through 5D are at least somewhat similar to the pixel in FIG. 5A, an explanation of similar structures and/or operations thereof will be omitted for the sake of clarity.

Referring to FIG. 5B, the pixel is a 3-transistor pixel and includes the photo sensitive device PD, the reset transistor RX, the drive transistor (or the source follow transistor) DX, and the select transistor SX. The transfer transistor TX and the transfer control signal TG are not present. Instead, the photocharge (or photocurrent) accumulated by the photo sensitive device PD is output directly to the floating diffusion node FD.

Referring to FIG. 5C, the pixel is a 5-transistor pixel and includes the photo sensitive device PD, the transfer transistor TX, the reset transistor RX, the drive transistor (or the source follow transistor) DX, the select transistor SX, and a fifth transistor GX. The fifth transistor GX forms an electrical path between the transfer control signal TG and the transfer transistor TX in response to the selection signal SEL input to a gate thereof.

FIG. 5D shows another example of a 5-transistor pixel. The pixel includes the photo sensitive device PD, the transfer transistor TX, the reset transistor RX, the drive transistor (or the source follow transistor) DX, the select transistor SX, and a sixth transistor PX. The sixth transistor PX forms an electrical path between the photo sensitive device PD and the transfer transistor TX in response to a sixth signal PG input to a gate thereof.

Meanwhile, each of the pixels having different structures as illustrated in FIGS. 5A through 5D may be configured independently or to share at least one element with other pixels. For instance, for two or four pixels having the structure illustrated in FIG. 5A, only photo sensitive device PD and transfer transistor TX may be independently implemented in each of the pixels and each of the other elements may be configured to be shared by all of the pixels. The pixels may be independently operated through timing control. The pixels sharing elements with each other may be arranged in a row direction, a column direction, or a combination thereof.

Referring back to FIG. 2, the analog readout circuit 113 reads out an analog pixel signal from a pixel selected in the pixel array 111. For instance, the analog readout circuit 113 may include a sample-and-hold circuit (not shown) which samples and holds signals output from pixels in a row selected by the row decoder/driver 112 among a plurality of pixels included in the pixel array 111. The analog readout circuit 113 may also include a correlated double sampling (CDS) circuit (not shown) which performs CDS on signals output form the sample-and-hold circuit.

The ADC 114 converts analog pixel signals output from the analog readout circuit 113 into digital signals to output digital pixel data. The RGB converter 115 converts the digital pixel data output from the ADC 114 into RGB Bayer data. Due to the non-RGB Bayer configuration of the pixels in the pixel array 111, the digital pixel data output from the ADC 114 is non-RGB Bayer data.

Figure 6:
FIG. 6 is a diagram showing the operation of an RGB converter illustrated in FIG. 2.

FIG. 6 is a diagram showing the operation of the RGB converter 115 illustrated in FIG. 2. The RGB converter 115 may generate an RGB Bayer signal (i.e., R, G, or B data arranged in a pattern illustrated at the bottom of FIG. 6) using at least one digital pixel data (e.g., at least one of digital pixel data D11 through D55 illustrated at the top of the FIG. 6). The digital pixel data D11 through D55 correspond to respective pixels of the pixel array 111. As illustrated at the bottom of the FIG. 6, RGB Bayer signals respectively corresponding to the pixels D11 through D55 include signals of rows R1, R3, and R5 in which R pixel signals alternate with G pixel signals and signals of rows R2 and R4 in which G pixel signals alternate with B pixel signals.

When a digital pixel signal corresponding to a target pixel represents the same type (or color) as an RGB Bayer signal, the RGB converter 115 may output the digital pixel signal as the RGB Bayer signal. When the digital pixel signal corresponding to the target pixel represents a different type or color than an RGB Bayer signal, the RGB converter 115 may perform an operation on at least two digital pixel signals to output an RGB Bayer signal. For instance, the RGB converter 115 may perform an operation on at least two pixel data selected in an operation block LB (e.g., a 3*3 square block illustrated in FIG. 6) including a target pixel (e.g., the pixel P33 at row R3 and column C3) to calculate RGB Bayer data of the target pixel. The target pixel P33 is a pixel corresponding to RGB Bayer data to be calculated and the operation block LB is a group of pixels including the target pixel and its neighboring pixels. The size of the operation block (i.e., the number of pixels included in the operation block) or the shape (e.g., a square, a rectangle, a line, or a rhombus) of the operation block may vary and are not limited to the embodiment of FIG. 6.

A digital pixel signal selected for an operation may represent the same type or color as the RGB Bayer signal of a target pixel. For instance, when the RGB Bayer signal of the target pixel P33 represents R, only pixel data representing the same type or color, e.g., R may be selected in the operation block LB including the target pixel P33 and the RGB converter 115 may output a result of the operation of the selected pixel data as converted R data.

Alternatively, a particular type pixel, e.g., a white and/or black pixel, may be always selected. Thus, the RGB converter 115 may select at least two signals from among digital pixel signals representing the same type or color as an RGB Bayer signal (e.g., an R signal) of a target pixel and/or particular-type (e.g., white and/or black) digital pixel signals in an operation block and performs an operation on the selected digital pixel signals to calculate an RGB Bayer signal corresponding to the target pixel.

Examples of such operations may be interpolation, averaging, weighted averaging, or summing of the selected pixel data, but example embodiments of the present invention are not restricted thereto. The interpolation may be linear interpolation or non-linear interpolation. When the RGB converter 115 performs an operation on two or more pixel data to generate RGB Bayer data as described above, noise may also be reduced.

Referring back to FIG. 2, the output buffer 116 buffers and outputs an RGB Bayer signal output from the RGB converter 115 in response to a column control signal (e.g., an address signal) output from the column decoder/driver 117. The column decoder/driver 117 decodes a column control signal (e.g., an address signal) generated by the timing controller 118 and selectively activates at least one column among a plurality of columns (not shown) included in the pixel array 111 in response to the decoded control signal (i.e., the decoded address signal).

The timing controller 118 generates at least one control signal for controlling at least one of the pixel array 111, the row decoder/driver 112, the analog readout circuit 113, the ADC 114, the RGB converter 115, the output buffer 116, and the column decoder/driver 117. RGB Bayer signals output from the output buffer 116 are input to the ISP 130. The ISP 130 generates an image of an object based on the RGB Bayer signals output from the image sensor 110.

Figure 1:
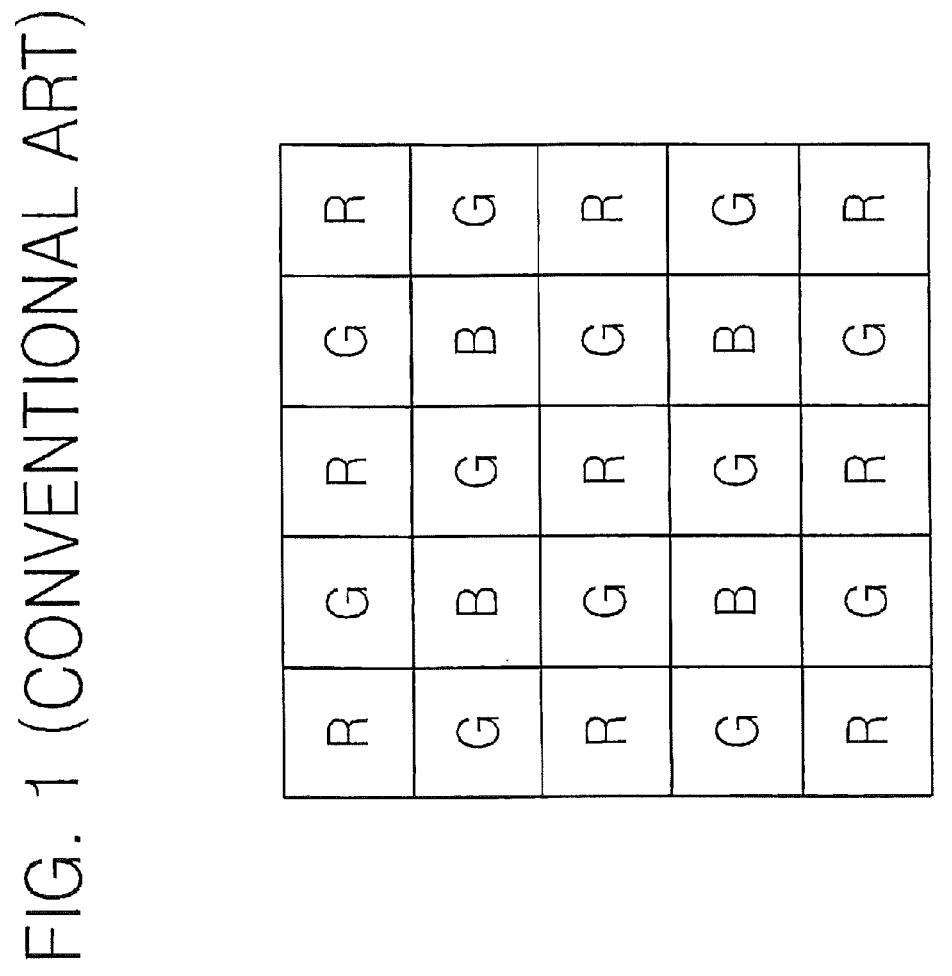
Figure 7:
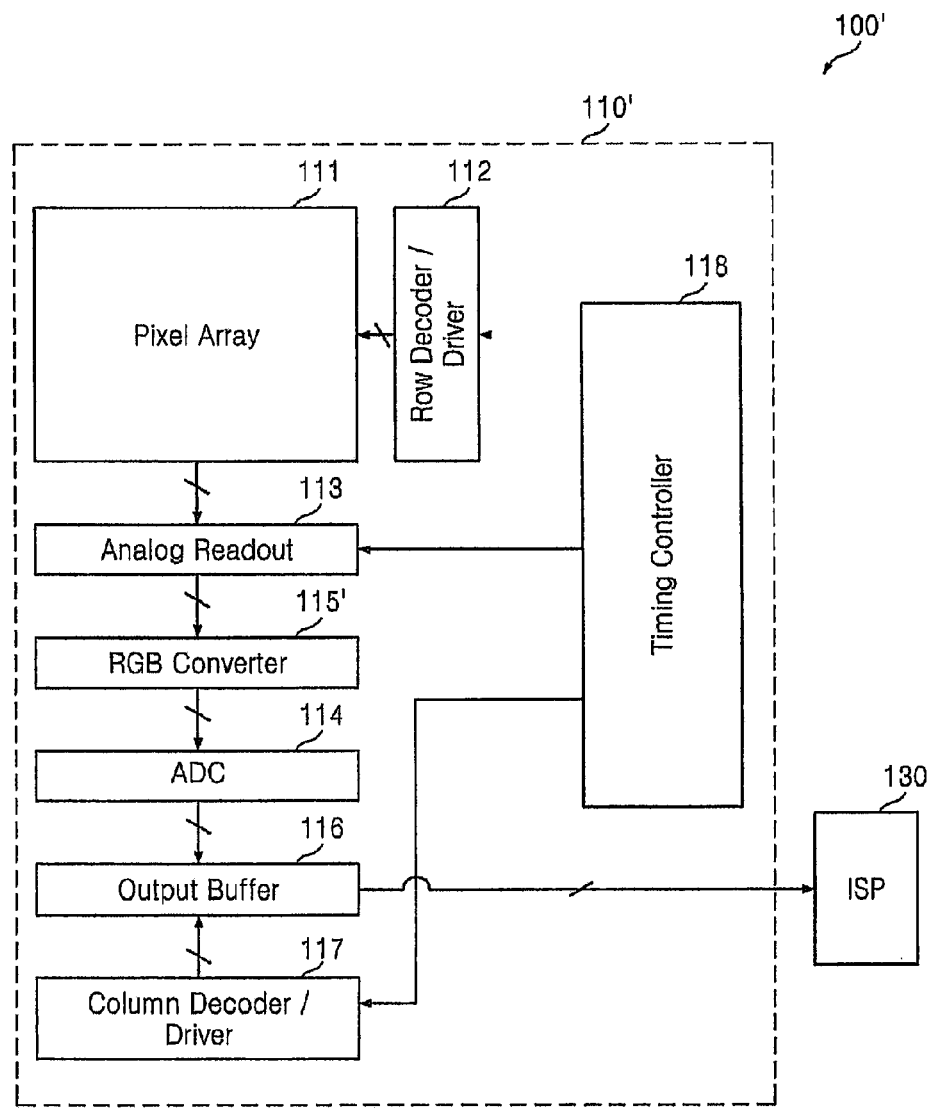
FIG. 7 is a block diagram of an image processing apparatus according to another embodiment of the present invention.

FIG. 7 is a block diagram of an image processing apparatus 100' according to another embodiment of the present invention. FIG. 8 is a diagram showing the operation of an RGB converter 115' illustrated in FIG. 7. An image sensor 110' illustrated in FIG. 7 is the same as the image sensor 110 illustrated in FIG. 2, with the exception that the RGB converter 115' operates before the ADC 114. Thus, only the differences between the embodiments of FIGS. 1 and 7 will only be described to avoid redundancy.

While the RGB converter 115 illustrated in FIG. 2 generates digital RGB Bayer data using digital pixel data, the RGB converter 115' illustrated in FIG. 7 generates analog. RGB Bayer signal using an analog pixel signal. Thus, the RGB converter 115' generates an RGB Bayer signal (i.e., an R, a G, or a B signal arranged in a pattern illustrated at the bottom of FIG. 8) using at least one analog pixel signal (e.g., at least one among pixels signals A11 through A55 illustrated at the top of FIG. 8). The analog pixel signal A11 through A55 corresponding to respective pixels.

The RGB converter 115' illustrated in FIG. 7 converts a non-RGB Bayer signal into an RGB Bayer signal using a similar method to that described above. However, the RGB converter 115' illustrated in FIG. 7 performs interpolation, averaging, weighted averaging, or summing on two or more pixel signals in analog mode while the RGB converter 115 illustrated in FIG. 2 performs these operations in digital mode.

An operation of the RGB converter 115' on the analog pixel data shown in FIG. 8 is similar to an operation of RGB converter 115 on the digital pixel data shown in FIG. 6. Therefore, a detailed discussion thereof will be omitted in order to avoid redundancy.

It has been described that non-RGB Bayer data is converted into RGB Bayer data in the above-described embodiments, but the present invention is not restricted to these embodiments. For instance, an image sensor may convert RGB Bayer data into non-RGB Bayer data.

Figure 9:
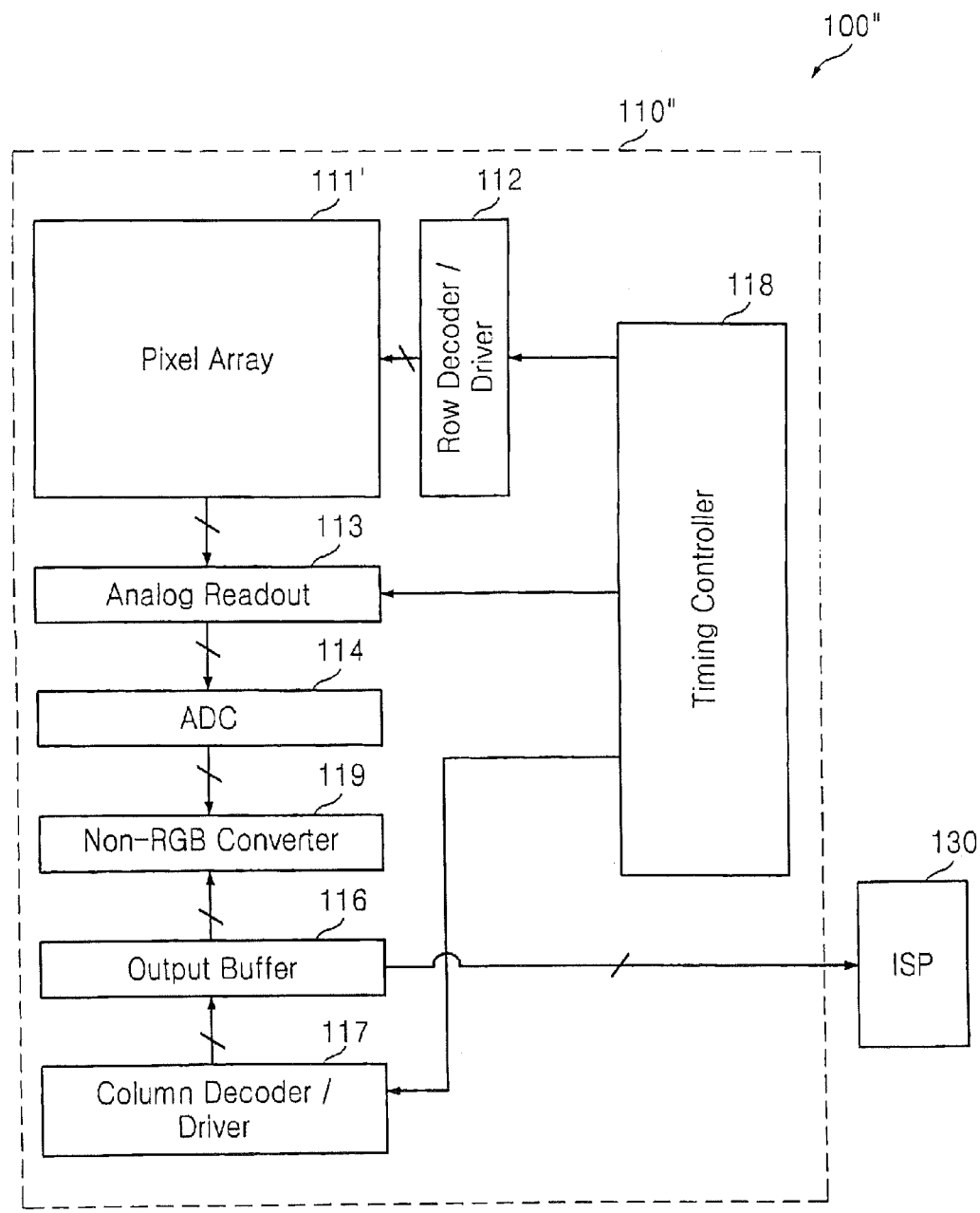
FIG. 9 is a schematic block diagram of an image processing apparatus 100" according to further embodiments of the present invention.
Figure 10:
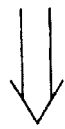
FIG. 10 is a diagram for explaining the operation of a non-RGB converter 119 illustrated in FIG. 9.

FIG. 9 is a schematic block diagram of an image processing apparatus 100" according to further embodiments of the present invention. FIG. 10 is a diagram for explaining the operation of a non-RGB converter 119 illustrated in FIG. 9. Since the image processing apparatus 100" illustrated in FIG. 9 has a similar structure to the image processing apparatus 100 illustrated in FIG. 2, only differences between the two apparatuses 100" and 100 will be described to avoid redundancy.

An image sensor 110" illustrated in FIG. 9 includes the non-RGB converter 119 instead of the RGB converter 115 of the image sensor 110 illustrated in FIG. 2. A pixel array 111' illustrated in FIG. 9 has the RGB Bayer pattern illustrated in FIG. 1. The non-RGB converter 119 converts RGB Bayer data into non-RGB Bayer data, as illustrated in FIG. 10. A non-RGB Bayer pattern may be any one of the patterns illustrated in FIGS. 4A through 4G, but the present invention is not restricted thereto.

In other embodiments of the present invention, an image sensor may have the non-RGB converter 119 disposed before the ADC 114, like the image sensor 110' illustrated in FIG. 7.

Figure 11:
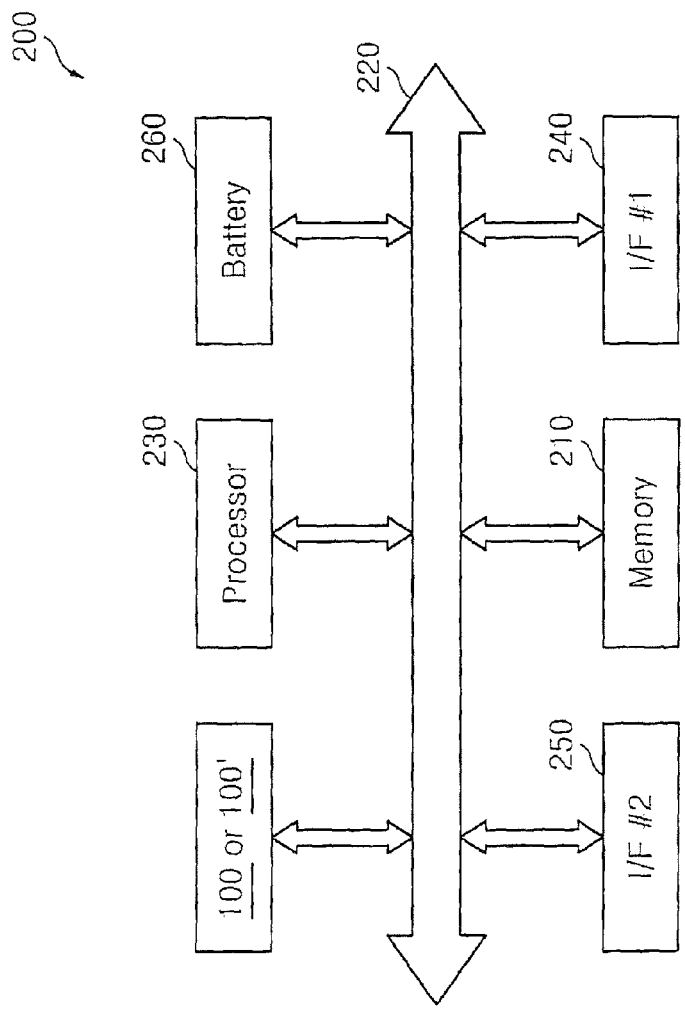
FIG. 11 is a block diagram of an electronic system including an image sensor according to an embodiment of the present invention.

FIG. 11 is a block diagram of an electronic system 200 including the image processing apparatus 100 or 100' according to an embodiment of the present invention. Referring to FIG. 11, the electronic system 200 may include image processing apparatus 100, a memory 210, and a processor 230, which are connected to a system bus 220. The electronic system 200 may be a digital camera, a mobile phone equipped with a digital camera, or a satellite system equipped with a camera, but the present invention is not restricted thereto.

The processor 230 may generate control signals for controlling the operations of the image processing apparatus 100 and the memory 210. The image processing apparatus 100 generates an image corresponding to a photographed subject and the memory 210 stores the image.

When the electronic system 200 is embodied as a portable application, the electronic system 200 may also include a battery 260 to supply operating power to the image processing apparatus 100, the memory 210, and the processor 230.

The electronic system 200 may also include an interface 240, e.g., an input/output unit, to communicate data with an external data processing device. When the electronic system 200 is embodied as a portable application, the electronic system 200 may also include a wireless interface 250. The electronic system may be a portable computer, a digital camera, a personal digital assistant (PDA), a wireless telephone, a MP3 player, a PMP (portable multimedia player), or an automotive navigation system.

As described above, according to an embodiment of the present invention, an image sensor converts an electrical signal output from a pixel array having a different pattern from an RGB Bayer pattern into an RGB Bayer signal, thereby becoming compatible with a universal ISP, which receives and processes the RGB Bayer signal, without requiring an additional compatible device or module.

While the present invention has been particularly shown and described with reference to example embodiments thereof, it will be understood by those of ordinary skill in the art that various changes in forms and details may be made therein without departing from the spirit and scope of the present invention as defined by the following claims.

What is claimed is:

1. An image sensor comprising:
a pixel array including a plurality of pixels arranged in a non-red-green-blue (RGB) Bayer pattern;
an analog-to-digital converter configured to convert analog pixel signals output from the plurality of pixels into digital pixel signals; and
an RGB converter configured to convert the digital pixel signals into RGB Bayer signals, wherein
the RGB converter is configured to use a digital pixel signal of the digital pixel signals as a RGB Bayer signal if the digital pixel signal corresponding to a target pixel represents a same type or color as the RGB Bayer signal corresponding to the target pixel,
the RGB converter is configured to perform an operation on at least two of the digital pixel signals to output the RGB Bayer signal if the digital pixel signal corresponding to the target pixel is not the same type or color as the RGB Bayer signal corresponding to the target pixel, and
the RGB Bayer signals include,
a first row of signals in which R pixel signals alternate with G pixel signals, and
a second row of signals in which G pixel signals alternate with B pixel signals.

2. The image sensor of claim 1, wherein the operation performed by the RGB converter is at least one of interpolation, weighted averaging, averaging, and summing.

3. The image sensor of claim 1, wherein,
the RGB converter is configured to select the at least two digital pixel signals that correspond to pixels in an operation block, the operation block including the target pixel, and
the RGB converter is configured to perform the operation on the selected digital pixel signals to output the RGB Bayer signal corresponding to the target pixel.

4. The image sensor of claim 3, wherein the RGB converter is configured to selectthe at least two digital pixel signals from among digital pixel signals in the operation block that have a same type or color as the RGB Bayer signal of the target pixel.

5. The image sensor of claim 3, wherein the operation performed by the RGB converter is at least one of interpolation, weighted averaging, averaging, and summing.

6. The image sensor of claim 3, wherein the operation block is a group of pixels including the target pixel and pixels neighboring the target pixel.

7. An image processing apparatus, comprising:
the image sensor of claim 1; and
an image signal processor configured to receive the RGB Bayer signals from the image sensor and configured to process the RGB Bayer signals.

8. An image sensor, comprising:
a pixel array including a plurality of pixels arranged in a non-red-green-blue (RGB) Bayer pattern;
an analog-to-digital converter configured to convert analog pixel signals output from the plurality of pixels into digital pixel signals;
an RGB converter configured to convert the digital pixel signals into RGB Bayer signals; and
an output buffer configured to buffer and output the RGB Bayer signals to an external image signal processor.

9. An image sensor apparatus, comprising:
a pixel array including a plurality of pixels arranged in a non-red-green-blue (RGB) Bayer pattern, each of the plurality of pixels configured to output a data signal in response to a light source;
an RGB converter configured to convert the plurality of data signals into RGB Bayer signals such that the RGB Bayer signals are arranged in a RGB Bayer pattern;
an external image signal processor configured to receive and process only RGB Bayer data, wherein the external image signal processor does not include any intervening compatible device or module for converting non-RGB Bayer data to RGB Bayer data; and
an output buffer configured to buffer and output the RGB Bayer signals to the external image signal processor.

10. The image sensor apparatus of claim 9, wherein the RGB converter is configured to convert the plurality of data signals at least one of before and after the plurality of data signals are converted from analog to digital signals by an analog-to-digital converter.

* * * * *